United States Patent
Kammann et al.

(10) Patent No.: US 12,054,046 B2
(45) Date of Patent: Aug. 6, 2024

(54) MOTOR VEHICLE WITH AN EXTERIOR LIGHTING UNIT, AND METHOD FOR OPERATING AN EXTERIOR LIGHTING UNIT

(71) Applicant: AUDI AG, Ingolstadt (DE)

(72) Inventors: Tanja Kammann, Munich (DE); Ashley Gleave, Buxheim (DE); Michael Horn, Ingolstadt (DE); Viktor Hahn, Bergheim (DE); Maximilian Manderscheid, Rohrbach (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 18/249,001

(22) PCT Filed: Sep. 15, 2021

(86) PCT No.: PCT/EP2021/075286
§ 371 (c)(1),
(2) Date: Apr. 13, 2023

(87) PCT Pub. No.: WO2022/078694
PCT Pub. Date: Apr. 21, 2022

(65) Prior Publication Data
US 2023/0382296 A1    Nov. 30, 2023

(30) Foreign Application Priority Data
Oct. 14, 2020  (DE) .................. 10 2020 126 929.3
Oct. 14, 2020  (DE) .................. 20 2020 105 875.4

(51) Int. Cl.
*B60K 35/00*  (2024.01)
*B60K 35/28*  (2024.01)
(Continued)

(52) U.S. Cl.
CPC ............ *B60K 35/00* (2013.01); *B60Q 1/507* (2022.05); *B60Q 1/543* (2022.05); *B60K 35/28* (2024.01);
(Continued)

(58) Field of Classification Search
CPC ....... B60Q 1/507; B60Q 1/5431; B60K 35/00
See application file for complete search history.

(56) References Cited

U.S. PATENT DOCUMENTS 6,443,602 B1 *  9/2002  Tanabe ................ B60Q 1/085
                                                           362/465
8,224,533 B2 *  7/2012  Furusawa ............ B60Q 1/143
                                                           701/45
(Continued)

FOREIGN PATENT DOCUMENTS

DE   202004009030 U1   8/2004
DE   102005001122 A1   7/2006
(Continued)

OTHER PUBLICATIONS

International Preliminary Report on Patentability directed to related International Patent Application No. PCT/EP2021/075286, completed Jan. 3, 2023, with attached English-language translation; 11 pages.
(Continued)

*Primary Examiner* — Bryon T Gyllstrom
(74) *Attorney, Agent, or Firm* — Sterne, Kessler, Goldstein & Fox P.L.L.C.

(57) ABSTRACT

The present disclosure relates to a motor vehicle with an exterior lighting unit and a controller, wherein the controller is configured, on the one hand, to actuate the exterior lighting unit in a first operating mode to output a first light pattern and to analyze a changeover condition and, when the changeover condition is satisfied, to change to a second
(Continued)

operating mode, and, on the other hand, to actuate the exterior lighting unit in the second operating mode to output a second light pattern different from the first light pattern, wherein the fulfillment of the changeover condition depends on which of a plurality of driving modes of the motor vehicle is selected for a current or future operation, and/or wherein the fulfillment of the changeover condition is dependent on an ascertained driver state.

10 Claims, 1 Drawing Sheet

(51) Int. Cl.
    *B60K 35/60*     (2024.01)
    *B60Q 1/50*     (2006.01)

(52) U.S. Cl.
    CPC ........ *B60K 35/60* (2024.01); *B60K 2360/172* (2024.01); *B60K 2360/175* (2024.01); *B60K 2360/797* (2024.01)

(56) References Cited

U.S. PATENT DOCUMENTS

| | | | | |
|---|---|---|---|---|
| 8,600,656 | B2* | 12/2013 | Mimeault | B60Q 1/0023 |
| | | | | 701/301 |
| 8,757,853 | B2* | 6/2014 | Robert | B60Q 1/12 |
| | | | | 362/465 |
| 9,013,058 | B2* | 4/2015 | Watanabe | B60Q 1/085 |
| | | | | 307/10.8 |
| 2003/0193812 | A1* | 10/2003 | Toda | B60Q 1/10 |
| | | | | 362/464 |
| 2009/0154181 | A1* | 6/2009 | Chen | B60Q 1/12 |
| | | | | 362/494 |
| 2011/0075435 | A1* | 3/2011 | Robert | B60Q 1/1423 |
| | | | | 362/465 |
| 2014/0347458 | A1 | 11/2014 | Tigerina et al. | |
| 2015/0197139 | A1* | 7/2015 | Song | B60Q 1/1423 |
| | | | | 362/464 |
| 2016/0159272 | A1* | 6/2016 | Kataike | B60Q 1/12 |
| | | | | 315/80 |
| 2016/0229395 | A1 | 8/2016 | Schmudderich | |
| 2018/0222492 | A1* | 8/2018 | Takii | F21S 41/675 |
| 2018/0312106 | A1 | 11/2018 | Tatara et al. | |
| 2020/0094734 | A1* | 3/2020 | King | B60Q 1/543 |

FOREIGN PATENT DOCUMENTS

| | | |
|---|---|---|
| DE | 102011119558 A1 | 5/2013 |
| DE | 102012013602 A1 | 4/2014 |
| DE | 102014209071 A1 | 11/2014 |
| DE | 102014111119 A1 | 2/2016 |
| EP | 3492317 A1 | 6/2019 |
| WO | WO 2016/050503 A1 | 4/2016 |

OTHER PUBLICATIONS

International Search Report and Written Opinion of the International Searching Authority directed to related International Patent Application No. PCT/EP2021/075286, mailed Dec. 10, 2021, with attached English-language translation; 15 pages.

\* cited by examiner

MOTOR VEHICLE WITH AN EXTERIOR LIGHTING UNIT, AND METHOD FOR OPERATING AN EXTERIOR LIGHTING UNIT

TECHNICAL FIELD

The present disclosure relates to a motor vehicle with an exterior lighting unit and a controller, wherein the controller is configured, on the one hand, to actuate the exterior lighting unit in a first operating mode in order for same to output a first light pattern and to analyze a changeover condition and change over to a second operating mode when the changeover condition is met and, on the other hand, to actuate the exterior lighting unit in the second operating mode in order for same to output a second light pattern differing from the first light pattern. In addition, the present disclosure relates to a method for operating at least one exterior lighting unit of a motor vehicle.

BACKGROUND

Exterior lighting units of motor vehicles are used on the one hand to illuminate the vehicle surroundings and, on the other hand, to provide other road users with information, for example regarding the position of the motor vehicle and a braking or planned turning operation. It has also already been proposed to use exterior lighting units for transmitting additional information. For example, DE 20 2004 009 030 U1 suggests using an additional display area of a brake light to display lettering, a logo, a pictogram, or a figure for a following driver. This display can be activated manually by a user and then be permanently active or can be active only when no braking operation exists.

While the described procedure can be advantageous, for example, for advertising purposes or for design reasons, it is only suitable to a limited extent for providing other road users with targeted information relating to the drive mode, since such information transmission depends on manual activation or deactivation by the driver of the motor vehicle.

BRIEF DESCRIPTION OF DRAWINGS/FIGURES

DETAILED DESCRIPTION

Figure 1:
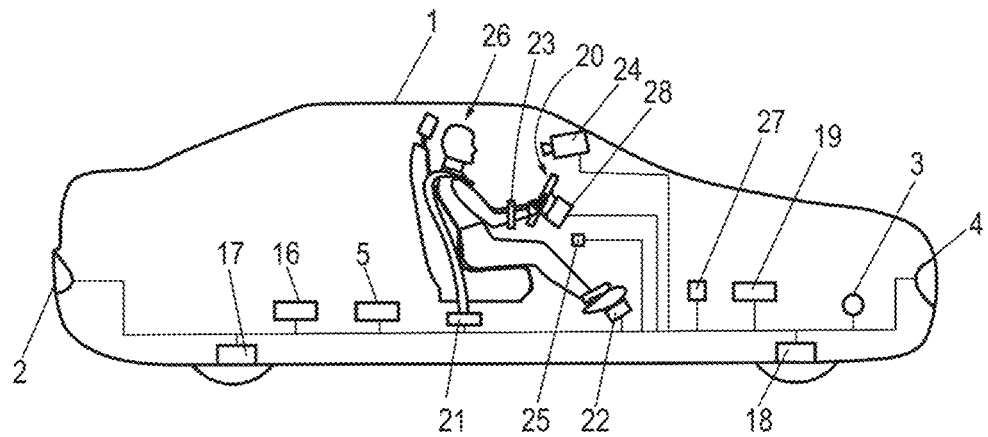
FIG. 1 illustrates a schematic diagram of a motor vehicle, in accordance with an exemplary embodiment.

The present disclosure is therefore based on the object of expanding the functionality of exterior lighting units, wherein in particular other road users are intended to be enabled to better assess driving situations.

According to the present disclosure, the object is achieved by a motor vehicle of the type mentioned at the outset, wherein the fulfillment of the changeover condition depends on which of a plurality of driving modes of the motor vehicle is selected for a current or future operation and/or wherein the fulfillment of the changeover condition depends on an ascertained driver state.

In modern motor vehicles, it is frequently possible to choose between different driving modes of the motor vehicle, which use different parameterizations of different vehicle components, for example the chassis and the drive train. For example, it may be possible to choose between driving modes for rather sporty driving, for more comfort-oriented driving and for efficiency-optimized driving. As a result of the method according to the present disclosure, the operating mode used can be communicated to other road users in a discreet manner, so that they can, for example, obtain relevant additional information about an acceleration behavior to be expected, steering interventions to be expected and the like.

Driver states, in particular mood states, can ultimately also be understood as a type of personal driving mode, since, for example, different emotional affects can lead to different driving behavior of the driver. By communicating the driver state via the exterior lighting unit, other road users can thus also be made aware of an expected driving behavior of their own motor vehicle in this case.

Thus, by using the exterior lighting unit according to the present disclosure, other drivers or automated driving systems can predict with higher accuracy a foreseeable future driving behavior of their own motor vehicle, thus enabling a considerably better coordination of different road users.

As will be explained in more detail later, it is also possible to provide more than two operating modes or more than two light patterns, so that a larger number of driving modes or driver states can be visualized. It is also advantageously made possible to switch from the second operating mode back to the first operating mode when a corresponding further changeover condition is met.

In the simplest case, the exterior lighting unit can be deactivated for the first light pattern and can be activated for the second light pattern. However, the exterior lighting unit is preferably active for emitting both light patterns. In particular, the shape of the light pattern can be adapted, for example by a plurality of separately controllable light segments or segments of an aperture being controlled differently in the different operating modes. Alternatively or additionally, the color and/or the intensity of the illumination can be varied locally, for example in individual segments, or over the entire luminous surface, in order to realize different light patterns.

The first and/or the second light pattern can also be a temporal pattern which comprises a temporal sequence or a continuous fading between a plurality of luminous images. For example, a flashing can be used both as the first light pattern and as a second light pattern, wherein luminous images of different shapes are emitted.

The exterior lighting unit may be a front, rear, or side lighting. This means, for example, that information can be output to following road users or to road users in front. Both the first and second operating modes can be used during normal driving operation. For example, when the drive mode is changed, it is possible to switch from the first to the second operating mode or vice versa during driving. The light patterns used are therefore preferably selected such that they satisfy legal framework conditions for driving operation.

In the event that the fulfillment of the changeover condition depends on which of the plurality of driving modes of the motor vehicle is selected for the current or future operation, the controller of the motor vehicle or a further controller can be configured to specify at least one parameter of a chassis and/or of a drive train and/or a steering system and/or a safety system of the motor vehicle depending on this selected driving mode. As driving modes, for example, a driving mode for efficiency optimization, a driving mode for comfort optimization and a dynamic or sporty driving mode can be selected. In particular, each of these driving modes can be assigned a respective operating mode and thus a respective light pattern, which is then emitted when the corresponding driving mode is selected. To set the parameters, the controller can control, for example, one or more actuators of the motor vehicle or adapt parameters of a corresponding further controller.

As a parameter of the chassis, for example, a characteristic curve of shock absorbers or air springs can be adjusted or, in general, a ground clearance, spring stiffness and/or damping of the suspension can be set. For example, the strength of a magnetic damping or a filling pressure of an air suspension can be adjusted.

With regard to the drive train, the switching speeds of an automatic transmission, a characteristic curve of the accelerator pedal, parameters of a differential, i.e., for example, a variable degree of locking or an active torque distribution, a crossfading between an electric drive and a drive by an internal combustion engine in hybrid vehicles, an optimization of the driving operation to a balanced charge state of an energy storage or to brief optimal driving powers, injection or ignition times and/or parameters for valve control can be adjusted as parameters, for example.

As parameters of a safety system, for example, trigger thresholds for belt tensioners or intervention thresholds for driver assistance systems for collision avoidance, which can be longitudinal and/or transverse, can be set.

As the parameter of the steering, an in particular speed-dependent characteristic curve of the steering or a steering ratio can be set. Additionally or alternatively, a degree of assistance of a power steering or the strength of a haptic feedback of a steer-by-wire system can be set.

Additionally or alternatively, the controller or the further controller can be configured to guide the motor vehicles at least partially in an automated manner in at least one of the driving modes, wherein the driving modes differ with respect to the degree of automation. In particular, the autonomy levels according to SAE J3016 can be considered as degrees of automation. For example, a different operating mode can be used or a different light pattern can be emitted, depending on whether there is no automation active, a driving assistance is active, partial automation is active, a conditional automation is active, a high automation is active or a full automation is active. It is of course possible here for only one sub-group of the stated degrees of automation, i.e., for example, only two or three degrees of automation, to be implemented in a motor vehicle according to the present disclosure, which can be visualized by different operating modes and thus by different light patterns.

In the event that the fulfillment of the changeover condition depends on the ascertained driver state, the motor vehicle can comprise at least one sensor, in particular an imaging sensor, for detecting sensor data relating to the driver, wherein the controller is configured to ascertain the driver state as a function of the sensor data. Approaches for ascertaining driver states, for example a tiredness or attention state, are known per se in the prior art and are not intended to be explained in detail. By means of an imaging sensor, for example, a viewing direction, pupil movements, a blinking and the like can be detected. In addition or as an alternative, minor steering movements, for example, which are constantly performed unconsciously by the driver during driving, can be evaluated. If, for example, it is now detected that the driver is tired or inattentive, a corresponding message can be given to the driver, as is known per se, that they should stop driving soon. In addition, by changing the operating mode and thus emitting a different light pattern, other road users can be alerted to the fact that reaction times may be increased or similar due to the ascertained driver state.

In principle, the sensors can alternatively be an operating means that does not directly affect the driving operation, for example a touchscreen, a rotary pushbutton or a microphone for recording voice inputs. This can serve, for example, for the controller to inquire about the state of the driver, for example his mood, actively, for example via a dialog system.

In the event that the fulfillment of the changeover condition depends on the ascertained driver state, the motor vehicle can comprise a communication interface for communicating with a communication device designed separately from the motor vehicle, in particular with a smartphone or a smart watch or a tablet PC, wherein the controller can be configured to ascertain the driver state in dependence on state information received from the communication device via the communication interface. For example, the communication device can comprise a sensor system which can detect physiological features of the driver, for example a skin temperature, a pulse and/or a blood pressure, as state information. Additionally or alternatively, the communication device can have operating elements which, as explained above, make it possible to communicate with a driver in order, for example, to determine his or her mood. Due to the advantageous possible combination of communication devices in the motor vehicle, the present disclosure also relates to a device which comprises the motor vehicle according to the present disclosure and a communication device, in particular a smartphone, a smart watch or a tablet PC.

The first and/or the second light pattern can be preset. In particular, a catalog of light patterns with their respective meaning can be specified by a specific manufacturer or across manufacturers. For example, a specific light pattern can thus always correspond to a sports mode and a specific light pattern can correspond to a comfort mode or the like. This enables drivers or driver assistance systems of other motor vehicles that analyze corresponding light patterns to recognize the driving mode or driver state directly and unambiguously on the basis of such a light pattern.

Alternatively, it could also be possible, for example, for at least parts of the light patterns used to be specified by the driver, for example via a corresponding app of a smartphone or another device external to the vehicle and/or via operating means of the motor vehicle. Preferably, a use of (pseudo) random patterns is avoided, since these are less suitable for transmitting certain information and, moreover, it is considerably more complex for such patterns to comply with legal requirements.

The light pattern can be a purely spatial pattern that does not change over time. Alternatively, a temporal pattern, i.e., a temporal sequence of luminous images, can be used. The temporal sequence can vary the luminous brightness of the entire exterior lighting unit, that is to say, for example, implement flashing, or switch or crossfade hard or continuously between different spatial patterns or luminous images. As a result, moving light patterns, i.e., for example, a swiping or the like, can also be implemented. Flashing can be realized in that a specific predetermined spatial pattern, i.e., in particular a driving mode- or driver state-specific light signature, and an empty pattern in which no segment is active, are used alternately. Temporal patterns can also comprise dimming ramps, a pulsation, a local displacement of illuminated areas and the like, for example. Spatial or temporal light patterns, which can also be referred to as light signature, can be stored in the memory of the motor vehicle itself or can be retrieved wirelessly from backend, for example.

The controller can be configured to actuate the exterior lighting unit both in the first and in the second operating modes as daytime running light or position light or tail light. It is thus expedient to choose the first and second light patterns or all light patterns used such that they correspond to the legal requirements for the corresponding use. Corresponding requirements result, for example, from Regulation 48 of the United Nations Economic Commission for Europe (UN/ECE). Legal requirements can specify in particular the colors and/or sizes or arrangements of luminous surfaces used or whether a specific spatial pattern should be emitted continuously or whether time-varying patterns, such as flashing, can or must be used.

The exterior lighting unit can have a plurality of independently controllable segments, wherein the first and second light patterns differ from one another at least with respect to the actuation of one of the segments. This is particularly useful if a single exterior lighting unit is to be used to implement a conventional lighting function, such as a daytime running light, a position light or a tail light, on the one hand, and to provide information to other road users about the driving mode or driver state used, on the other. In particular, at least partially different segments can be used to emit the different light patterns. By actuating different segments for light emission or actuating the segments for light emission with different brightnesses, requirements regarding the size or arrangement of the luminous surface, the luminous brightness and the color for the corresponding light function can be fulfilled independently of the light pattern used.

The different segments can all lie within a luminous surface, but also form luminous surfaces that are spatially offset with respect to one another, wherein a characteristic and eye-catching appearance can be achieved by means of a three-dimensional arrangement of several luminous surface. Each segment can have a single light source or several jointly controlled light sources, for example LEDs or OLEDs.

In addition to the explained communication of the driving mode or the driver state to other road users, the use of exterior lighting units with a plurality of independently controllable segments can be used, for example, to present different light signatures for selection by the users, which can be selected, for example, in the vehicle itself or via an external device, e.g., a smartphone or a backend server, or can be selected already when purchasing of the vehicle. In addition, by such a segmentation, further functions can be implemented, for example an approach warning, in which particularly many, in particular all, segments are activated when another vehicle approaches too closely.

The controller can be configured to analyze at least one further changeover condition in the second operating mode and to switch to the first operating mode or a respective further operating mode when a respective one of the further changeover conditions is met, wherein the fulfillment of the respective further changeover conditions depends on which of the plurality of driving modes of the motor vehicle is selected for a current or future operation, and/or wherein the fulfillment of the respective further changeover condition depends on the ascertained driver state. As a result, a change back to the first operating mode or to the first light pattern can take place when an original driving mode or driver state is reached again. In addition, several different driving modes or driver states can be visualized by corresponding operating modes and light patterns.

For example, a standard light signature or a standard light pattern could be used in the first operating mode, wherein, when a change to a specific driving mode occurs or when a specific driver state is ascertained, a changeover to the second operating mode and thus to the second light pattern is initiated. If said driving mode is left again or said driver state is no longer ascertained, a changeover back to the original first light pattern and operating state can be initiated. However, it is also possible that in the background the standard light signature, which can be preset on the driver's side, for example, has been changed to a different standard light signature, so that a different lighting pattern results when changing back.

The change of the driving mode and thus of the emitted light pattern or the light signature can take place manually by the driver, for example by actuating a corresponding operating element in the vehicle interior or on a separately designed communication device. Alternatively, an automatic change of the driving mode can also take place. For example, a change to an efficiency-optimized mode can be made as a function of the state of charge of a battery of the motor vehicle, or a driving mode change can be made automatically when a certain driver state, such as a tired or inattentive driver, is detected.

In addition to the motor vehicle according to the present disclosure, the present disclosure relates to a method for operating at least one exterior lighting unit of a motor vehicle, wherein
  the exterior lighting unit is actuated in a first operating mode to output a first light pattern,
  a changeover condition is repeatedly analyzed during operation in the first operating mode, wherein, in the context of this analysis, it is taken into account on the one hand, which of a plurality of driving modes of the motor vehicle is selected for a current or future operation, and/or on the other hand, a driver state of a driver of the motor vehicle is ascertained and taken into account,
  when the changeover condition is met, a changeover to a second operating mode takes place, and
  the exterior lighting unit is actuated in the second operating mode to output a second light pattern different from the first light pattern.

The features disclosed with respect to the motor vehicle according to the present disclosure or to the device according to the present disclosure which additionally comprises a communication device can be transferred to the method according to the present disclosure with the advantages mentioned therein, and vice versa.

Further advantages and details of the present disclosure emerge from the following exemplary embodiments and the associated drawings. FIG. 1 illustrates a motor vehicle 1 with several exterior lighting units 2, 3, 4 and a controller 5 for controlling the exterior lighting units 2, 3, 4. The exterior lighting unit 2 is a rear light, the exterior lighting unit 3 is a lateral position light and the exterior lighting unit 4 is a daytime running light.

Figure 2:
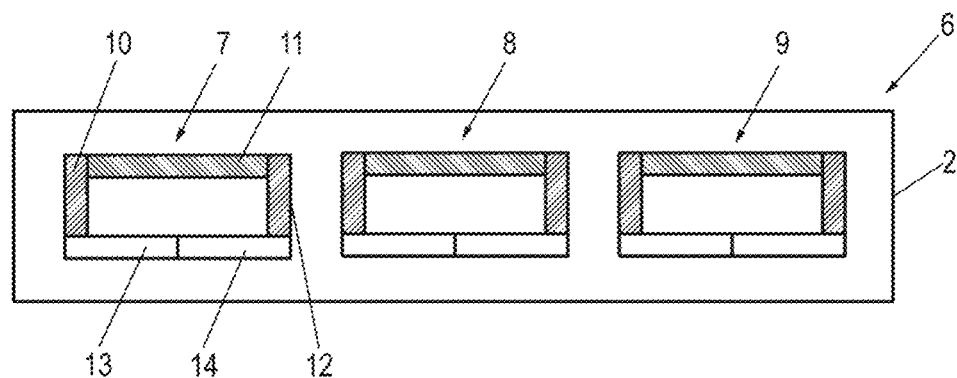
FIG. 2 illustrates a schematic diagram of an exterior lighting unit of the exemplary embodiment.
Figure 3:
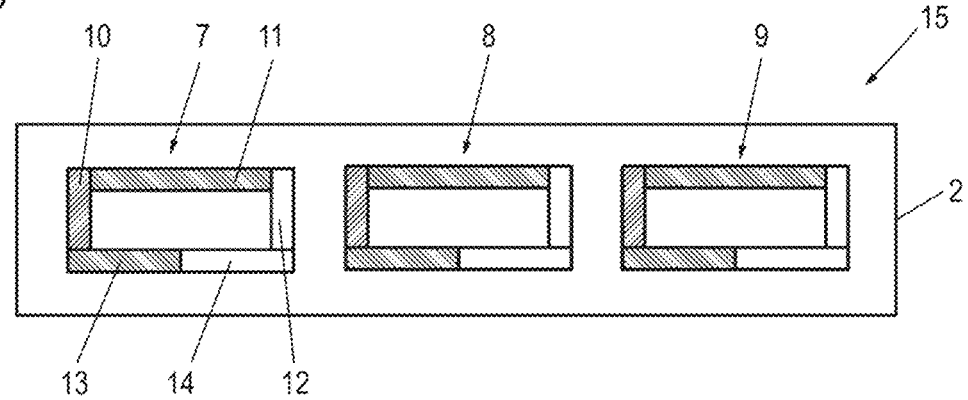
FIG. 3 illustrates a schematic diagram of an exterior light unit of the exemplary embodiment with a different emitted light pattern.

As shown by way of example in FIGS. 2 and 3 for the exterior lighting unit 2, the respective exterior lighting unit 2, 3, 4 in each case comprises a plurality of segments 10-14 which can be controlled separately. The exterior lighting unit 2 in this case comprises three separate luminous surfaces 7, 8, 9, which are arranged in particular spatially offset to one another in order to produce an interesting luminous image.

In the light pattern 6 shown in FIG. 2, the segments 10, 11, 12 are active for the respective luminous surface 7, 8, 9 and the segments 13, 14 are switched off. If the controller 5 detects that a changeover condition is met, said controller switches from a first operating mode, in which the exterior lighting unit 2 is actuated to output the first light pattern 6, into a second operating mode in which the exterior lighting unit 2 is actuated to output the second light pattern 15 shown in FIG. 3. In the latter, the segments 10, 11, 13 are active for the respective luminous surface 7, 8, 9 and the segments 12, 14 are switched off.

In the motor vehicle 1 shown in FIG. 1, such a change of light patterns 6, 15 can be used to provide information to other road users as to which of several driving modes the motor vehicle 1 is operating in. Alternatively or additionally, the light pattern 6, 15 used or the selection of the corresponding operating state can depend on the ascertained driver state of the driver 26.

In the first case, the light pattern 6 can correspond, for example, to a comfort mode and the light pattern 15 can correspond, for example, to a sports mode. Corresponding driving modes can be selectable by the driver 26 by an operating means 25 of the motor vehicle 1. Depending on the selected driving mode, parameters of the chassis 17, 18, the drive train 19, the steering 20 and/or the safety system 21 are set by the further controller 16 of the motor vehicle 1 or, in an alternative embodiment, directly by the controller 5 itself. Examples of such settings have already been explained in the general part of the description and will not be repeated in detail here.

Purely by way of example, a characteristic curve of the accelerator pedal sensor 22 can be adjusted with respect to the drive train 19 and/or a shift speed of an automatic transmission can be specified. With respect to a steering system, for example, a steering angle can be detected using the steering sensor 28 and a transmission ratio or a haptic feedback of a steer-by-wire system can be adjusted. With respect to a safety system 21, a trigger point of a belt tensioner can be set, for example. To adjust a chassis 17, 18, for example, magnetic damping or a pressure in air springs can be adjusted.

As an alternative to a manual selection of the driving mode to be used, such a selection can also take place automatically, for example as a function of a detected driver state. For this purpose, information about the driver state can be ascertained, for example via the sensor 24, which is, for example, an interior camera or via the steering sensor 28. In addition, a detection of state information can take place via a communication device 23, which is designed separately from the motor vehicle, in the present example via a smartwatch. For example, a pulse or a blood pressure of the driver 26 can be measured. Detected state information can be transmitted to the motor vehicle 1 via the communication interface 27 and analyzed there by the controller 5.

For example, if the driver is found to be agitated, the system can automatically switch from a sports mode to a comfort mode. If, for example, a tiredness of the driver 26 is ascertained, an automated driving operation can be initiated and thus changed from a low-automated driving mode to a higher-automated driving mode. These automatic changes between different driving modes can also be visualized for other road users by changing the operating mode of the controller 5 and thus by changing the light pattern emitted via the exterior lighting unit 2.

While a driver state was analyzed in the above example in order to change a driving mode of the motor vehicle and only the change of the driving mode was visualized by selecting a corresponding light pattern, it is alternatively or additionally possible that the used operating mode of the controller 5 and thus the light pattern emitted via at least one of the exterior lighting units 2, 3, 4 depends on a driver state. For example, based on a driver's ascertained fatigue or low alertness, the light pattern can be changed to alert surrounding traffic of this, while the driver 26 can be prompted to take a break and thus temporarily park the motor vehicle at a suitable location.

As is evident from a comparison of the light patterns 6, 15 shown in FIGS. 2 and 3, the same number of segments 10-14 are active for both light patterns 6, 15, so that a similarly dimensioned luminous area and similar brightnesses are achieved for both light patterns 6, 15. In particular, the two light patterns 6, 15 can thus fulfill legal requirements for an exterior lighting unit 2 used as a tail light, so that independent of the operating mode of the controller 5 used or independently of the light pattern 6, 15 used, the exterior lighting unit 2 can fulfill the function as a tail light or position light. Accordingly, the exterior lighting unit 3 can, for example, simultaneously serve as a turn signal and as a means for outputting information via the selected light pattern, and the exterior lighting unit 4 can simultaneously serve as daytime running light and as means for outputting information by way of selection of a corresponding light pattern.

By way of example, only two different light patterns 6, 15 are shown in FIGS. 2 and 3. However, a plurality of further light patterns can be realized by a different selection of the light segments 10-14 used, wherein it is also possible, for example, that different ones of the segments 7-14 are activated for different ones of the luminous surfaces 7-9. It is thus possible, for example, to use three different light patterns in order to visualize a comfort mode, a sports mode and an efficiency mode of the motor vehicle 1. Alternatively or additionally, different light patterns can be used to visualize different degrees of automation and/or to visualize certain driver states.

The invention claimed is:
1. A motor vehicle comprising:
an exterior lighting unit; and
a controller configured to:
  actuate the exterior lighting unit in a first operating mode to output a first light pattern;
  analyze a changeover condition, wherein a fulfillment of the changeover condition depends on which one of a plurality of driving modes of the motor vehicle is selected for a current or future operation;
  in response to the changeover condition being satisfied, change to a second operating mode; and
  actuate the exterior lighting unit in the second operating mode to output a second light pattern, wherein the second light pattern is different from the first light pattern; and
the controller being further configured to, or a further controller configured to:
  set, as a function of the selected driving mode, a parameter of at least one of a chassis or a drive train or a steering system,
  wherein the parameter of the drive train is at least one of switching speeds of an automatic transmission, a characteristic curve of an accelerator pedal, or a parameter of a differential system,
  wherein the parameter of the steering system is at least one of a characteristic curve of steering, a steering ratio, or a degree of assistance of power steering.

2. The motor vehicle according to claim 1, wherein the controller or the further controller is further configured to:
specify, as a function of the selected driving mode, a parameter of a safety system of the motor vehicle, and/or guide the motor vehicle at least partially in an automated manner in at least one of the driving modes, wherein the driving modes differ with respect to a degree of automation.

3. The motor vehicle according to claim 1, wherein the fulfillment of the changeover condition additionally depends on an ascertained driver state.

4. The motor vehicle according to claim 3, further comprising:
a sensor configured to detect sensor data relating to a driver,
wherein the controller is further configured to ascertain a driver state based on the sensor data.

5. The motor vehicle according to claim 3, further comprising:
a communication interface configured to communicate with a communication device,
wherein the controller is further configured to ascertain a driver state as a function of state information received from the communication device via the communication interface.

6. The motor vehicle according to claim 1, wherein at least one of the first light pattern or the second light pattern is preset.

7. The motor vehicle according to claim 1, wherein the controller is further configured to actuate the exterior lighting unit both in the first operating mode and in the second operating mode as a position light or a tail light.

8. The motor vehicle according to claim 1,
wherein the exterior lighting unit comprises a plurality of independently controllable segments, and
wherein the first light pattern and the second light pattern differ from one another with respect to actuation of one of the plurality of independently controllable segments.

9. The motor vehicle according to claim 1, wherein the controller is further configured to:
analyze a further changeover condition in the second operating mode, wherein a fulfillment of the further changeover condition depends on at least one of the selected driving mode for a current or future operation, or an ascertained driver state, and
in response to the further changeover condition being satisfied, switch to the first operating mode or a respective further operating mode.

10. A method for operating a lighting unit of a motor vehicle, the method comprising:
actuating an exterior lighting unit in a first operating mode to output a first light pattern;
repeatedly analyzing a changeover condition during operation in the first operating mode, the analyzing taking into account which of a plurality of driving modes of the motor vehicle is selected for a current or future operation;
in response to the changeover condition being satisfied, changing over to a second operating mode;
actuating the exterior lighting unit in the second operating mode to output a second light pattern, wherein the second light pattern is different from the first light pattern; and
setting, by a controller or a further controller of the motor vehicle, a parameter of at least one of a chassis or a drive train or a steering system, the specifying being a function of the selected driving mode,
wherein the parameter of the drive train is at least one of switching speeds of an automatic transmission, a characteristic curve of an accelerator pedal, or a parameter of a differential system,
wherein the parameter of the steering system is at least one of a characteristic curve of steering, a steering ratio, or a degree of assistance of power steering.

* * * * *